US012069468B2

(12) United States Patent
Zheng et al.

(10) Patent No.: US 12,069,468 B2
(45) Date of Patent: Aug. 20, 2024

(54) ROOM CALIBRATION BASED ON GAUSSIAN DISTRIBUTION AND K-NEAREST NEIGHBORS ALGORITHM

(71) Applicant: HARMAN INTERNATIONAL INDUSTRIES, INCORPORATED, Stamford, CT (US)

(72) Inventors: Jianwen Zheng, Guangdong (CN); Shao-Fu Shih, San Jose, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 52 days.

(21) Appl. No.: 17/640,554

(22) PCT Filed: Sep. 20, 2019

(86) PCT No.: PCT/CN2019/106905

§ 371 (c)(1),
(2) Date: Mar. 4, 2022

(87) PCT Pub. No.: WO2021/051377

PCT Pub. Date: Mar. 25, 2021

(65) Prior Publication Data

US 2022/0360927 A1 Nov. 10, 2022

(51) Int. Cl.
*H04S 7/00* (2006.01)

(52) U.S. Cl.
CPC .................................... *H04S 7/301* (2013.01)

(58) Field of Classification Search
CPC ... H04S 7/301; H04S 3/00; H04S 5/00; H04R 3/04; H04R 29/001
USPC .................................................. 381/300, 303
See application file for complete search history.

(56) References Cited

U.S. PATENT DOCUMENTS

| | | | |
|---|---|---|---|
| 6,721,428 B1 | 4/2004 | Allred et al. | |
| 7,158,643 B2 | 1/2007 | Lavoie et al. | |
| 7,483,540 B2 | 1/2009 | Rabinowitz et al. | |
| 9,832,590 B2 * | 11/2017 | Robinson | H04S 7/307 |
| 2003/0235318 A1 | 12/2003 | Bharitkar et al. | |
| 2015/0078596 A1 | 3/2015 | Sprogis | |

FOREIGN PATENT DOCUMENTS

| | | |
|---|---|---|
| CN | 1659927 A | 8/2005 |
| CN | 102907116 A | 1/2013 |
| CN | 103718574 A | 4/2014 |
| CN | 104186001 A | 12/2014 |

(Continued)

OTHER PUBLICATIONS

International Search Report dated Jun. 24, 2020 for PCT Appn. No. PCT/CN2019/106905 filed Sep. 20, 2019, 10 pgs.

(Continued)

*Primary Examiner* — Yosef K Laekemariam
(74) *Attorney, Agent, or Firm* — Brooks Kushman P.C.

(57) ABSTRACT

A method of room calibration comprises measuring a plurality of impulse responses at a plurality of measurement points in a room for each speaker of a plurality of speakers. The method also comprises determining a plurality of transfer functions at the plurality of measurement points for each speaker based on the plurality of impulse responses. Furthermore, the method also comprises weighting and summing the transfer functions to obtain a weighted and summed sound curve for each speaker.

17 Claims, 4 Drawing Sheets

(56) References Cited

FOREIGN PATENT DOCUMENTS

| | | | | |
|---|---|---|---|---|
| CN | 104581604 A | | 4/2015 | |
| CN | 106063293 A | | 10/2016 | |
| CN | 106535076 A | | 3/2017 | |
| CN | 110248480 A | | 9/2019 | |
| DE | 102004018375 A1 | | 11/2005 | |
| IN | 107079229 A | | 8/2017 | |
| JP | 2008294620 A | | 12/2008 | |
| WO | WO-2014116518 | * | 1/2014 | ............. H04R 29/00 |

OTHER PUBLICATIONS

Bharitkar, S. et al., "A Cluster Centroid Method for Room Response Equalization at Multiple Locations", Oct. 21, 2001, 4 pgs.
Carini, A., et al., "Multiple Position Room Response Equalization in Frequency Domain", IEEE Transactions on Audio, Speech and Language Processing, Jun. 2, 2011, 14 pgs., vol. 20, No. 1.
European Search Report dated May 19, 2023 for European Patent Application No. 19945626.0, 7 pages.
First Chinese Office Action dated Jan. 26, 2024 for Chinese Application No. 201980099572.0 filed Feb. 21, 2022, 10 pgs.

* cited by examiner

ROOM CALIBRATION BASED ON GAUSSIAN DISTRIBUTION AND K-NEAREST NEIGHBORS ALGORITHM

CROSS-REFERENCE TO RELATED APPLICATION

This application is the U.S. national phase of PCT Application No. PCT/CN2019/106905 filed on Sep. 20, 2019 the disclosure of which is hereby incorporated in its entirety by reference herein.

BACKGROUND

The present disclosure is related to room calibration, and more specifically, to room calibration based on a Gaussian distribution and a k-nearest neighbors algorithm.

A home theater system moves more and more from traditional stereo system to a multi-channel system. This type of audio system, such as a 5.1/7.1 home theater, WIFI speaker system, can create an immersive environment with realistic surround effect. However, setting up an audio system to produce high quality sound at home is a difficult task. When the audio system is put into a common room, the room will often in some way degrade the sound quality. In fact, this system should be installed in listening rooms that are professionally designed and use sound diffusers and absorption material to improve the room acoustics. Nevertheless, for most rooms, people find it difficult to improve their home theater in this way. Sometimes, even in the carefully designed room with diffusers and absorption, the user may still not get the best acoustic performance, since each speaker could be placed randomly in the room, depending on the room environment and configuration. Thus, the listener might feel unbalanced among each channel.

In recent years, room calibration that can balance the sound of each channel and improve the overall room acoustic performance has attracted many companies' attention. Most of the room calibration methods calibrate the delay, gain or frequency response of the speaker, but the room calibration methods only optimize the sound performance within a small listening area. Besides, the room calibration methods might use some annoying noise as measurement signal.

SUMMARY

According to one embodiment of the present disclosure, a method for room calibration, comprises measuring a plurality of impulse responses at a plurality of measurement points in a room for each speaker of a plurality of speakers. The method also comprises determining a plurality of transfer functions at the plurality of measurement points for each speaker based on the plurality of impulse responses. Furthermore, the method also comprises weighting and summing the transfer functions to obtain a weighted and summed sound curve for each speaker.

Another embodiment of the present disclosure is a system that includes a speaker system and a processor. The speaker system includes a plurality of speakers. A processor is configured to measure a plurality of impulse responses at a plurality of measurement points in a room for each speaker of the plurality of speakers. The processor is further configured to determine a plurality of transfer functions at the plurality of measurement points for each speaker based on the plurality of impulse responses. Also, the processor is configured to weight and sum the transfer functions to obtain a weighted and summed sound curve for each speaker.

Another embodiment of the present disclosure is a computer program product. The program code is configured to measure a plurality of impulse responses at a plurality of points in a room for each speaker of a plurality of speaker. The program code is configured to determine a plurality of transfer functions at the plurality of points for each speaker based on the plurality of impulse responses. Furthermore, the program code is configured to weight and sum the transfer functions to obtain a weighted and summed sound curve for each speaker.

Figure 1:
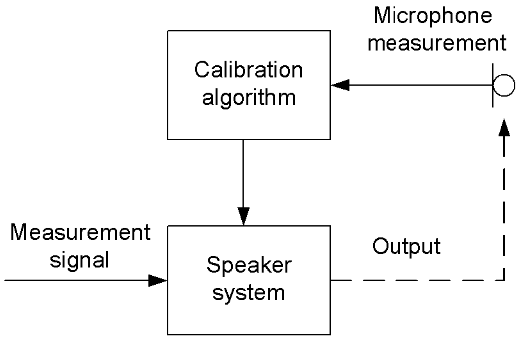
FIG. 1 illustrates a schematic view of a system for room calibration.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified, and details or components omitted for clarity of presentation and explanation. The drawings and discussion serve to explain principles discussed below, where like designations denote like elements.

DETAILED DESCRIPTION OF THE PREFERRED EMBODIMENTS

Embodiments herein describe a room calibration system and a room calibration that are based on the Gaussian distribution and k-nearest neighbors algorithm. Instead of relying on a noise that is annoying as a measurement signal, the room calibration system and method described herein use a predetermined signal (e.g., a custom sine tone) as a measurement signal, which could measure full band spectrum. Moreover, to achieve a better approach of room calibration, instead of performing room measurements by microphones on devices (near field measurements), the system for room calibration herein performs room measurements by one or more external microphone (far field measurements).

In a multi-channel speaker system, a plurality of amplifiers and speakers are usually used to provide a listener with some simulated placement of sound sources. The multichannel sound can be reproduced through each speaker to the listening area and create a realistic listening environment. When setting up the multi-channel speaker system in a room, the user wants to have the best performance of the system as that in the test lab. However, the room environment and the configuration are usually different with those of the test lab. Thus, the system needs to be in-situ reconfigured, so that the sound from all the speakers arrives at a listener's ear with the desired frequency response.

To do so, the system for room calibration may include a calibration system and a speaker system comprising a plurality of speakers. The system for room calibration may further include one or more microphones. For example, the calibration system can be implemented as a processor or a controller. FIG. 1 illustratively shows the calibration model of the system for room calibration using, for example, one external microphone. The measurement signal is input sequentially to each speaker included in the speaker system, and then the output signal of the speaker system may be, measured by the microphone independently. The measurement signal could be used to measure the full band frequency response of the speaker, and the measurement signal may be, for instance, a custom sine tone. Instead of optimizing only one listening spot, or a very narrow listening area in most of the room calibration methods, the system described herein creates a wide-optimized listening area by measuring the responses of most measurement points in the room, thus achieving a better performance of room calibration.

Figure 2:
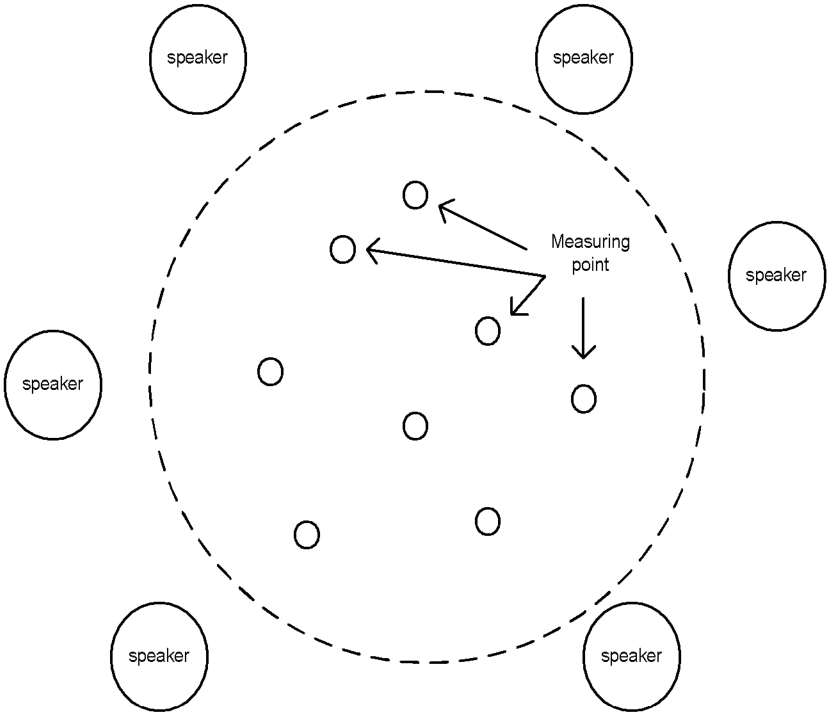
FIG. 2 illustrates a schematic view of a system with multi-points measurement.

FIG. 2 shows a schematic view of a multi-point measurement configuration in a room, which may include a plurality of speakers and a plurality of the measuring points. The configuration of the plurality of measuring points and the plurality of speakers as disclosed herein is only an example for illustration.

In one aspect, the system for room calibration measures a plurality of impulse responses at a plurality of points in a room for each speaker of the plurality of speakers. The system determines a plurality of transfer functions at the plurality of points for each speaker based on the plurality of impulse responses. Moreover, the system weights and sums the transfer functions to obtain a weighted and summed sound curve for each speaker. Regardless of the number or the location of the measurements points and the number or the location of the speaker, the system may perform the room calibration in order to optimize audio performance. The system may also run in the lab or user's home for training the calibration mode. For example, the measured frequency responses (namely magnitude and phase) can be stored as a dataset. For each measured dataset, there will be a reference tuning tone based on that particular room setup. Those data are called training data, which are used to produce statistical models. For example, during data training, the system weights and sums the transfer functions to obtain a weighted and summed sound curve for each speaker, as a predict output.

Figure 3:
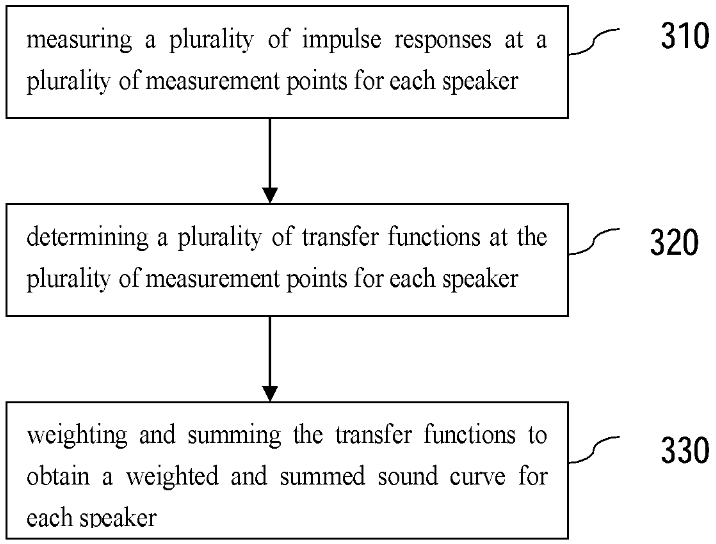
FIG. 3 is a flowchart of the method for room calibration according to one embodiment of the present disclosure.

FIG. 3 illustrates a flowchart of a method of room calibration. To improve understanding, the blocks of method are described in reference with the system shown in FIGS. 1-2. At block 310, one or more microphones can measure a plurality of impulse responses at a plurality of points in a room for each speaker of a plurality of speakers. For example, the microphone(s) can obtain the microphone measurement $h_{ij}$. Assuming there are totally I speakers and J measuring points, $h_{ij}$ represents the impulse response between the $i^{th}$ fine-tuned speaker and the microphone at the $j^{th}$ position. At block 320, the transfer function $H_{ij}$ can be determined based on the impulse response, $H_{ij}$ represents the transfer function between the $i^{th}$ fine-tuned speaker and the microphone at the $j^{th}$ position. They satisfy the following equation, $$H_{ij}=\mathcal{F}(h_{ij}),\ \text{for } i=1\ldots I \text{ and } j=1\ldots J \qquad (1)$$

where F(*) denotes the Discrete Fourier Transformation.

Then, at block 330, the method weights and sums the transfer functions of all points for each speaker to obtain a weighted and summed sound curve for each speaker. For example, for the $i^{th}$ fine-tuned speaker, all transfer functions between the $i^{th}$ speaker and the J measurement points can be calculated by weighting and summing based on the Gaussian distribution and k-nearest neighbors algorithm.

Figure 4:
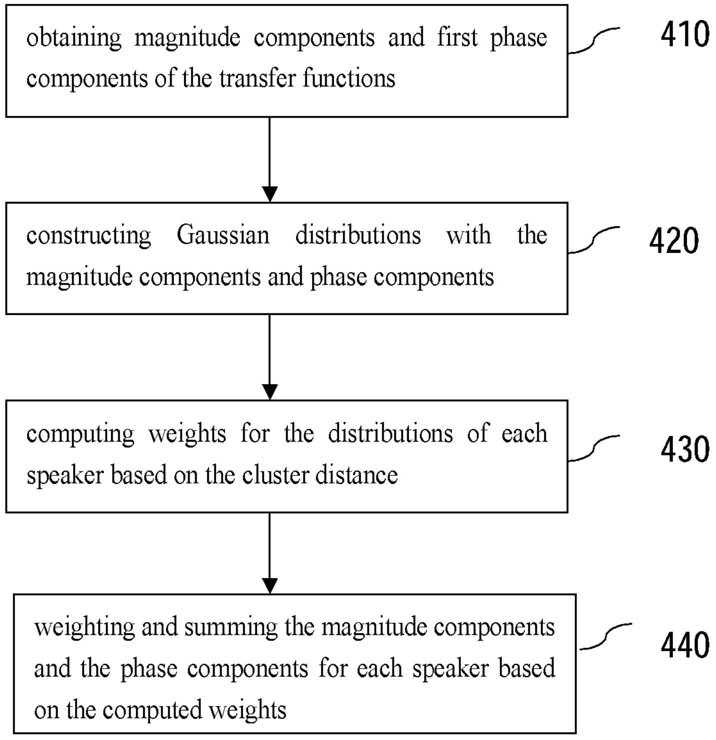
FIG. 4 is a flowchart of the method for room calibration according to another embodiment of the present disclosure.

FIG. 4 shows the method of weighting and summing process using the Gaussian distribution in combination with the k-nearest neighbors algorithm.

As shown in FIG. 4, at block 410, based on the transfer functions for each speaker, the magnitude components and the phase components can be calculated. For example, assuming $H_{ij}$ is composed of a magnitude component $M_{ij}$ and a phase component $\varphi_{ij}$, which can be calculated as, $$M_{ij}=|H_{ij}| \qquad (2)=$$

$$\varphi_{ij}=\text{angle}(H_{ij}) \qquad (3)$$

where angle(*) and |*| are the angle operator and the absolute value operator, respectively.

Then, at block 420, Gaussian distributions of the first magnitude components and the first phase components for each speaker can be constructed. For example, 2×I Gaussian distributions for the normalized $M_i$ and $\varphi_i$ of the $i^{th}$ fine-tuned speaker may be constructed. The Gaussian distribution is written as, $$N(x|\mu,\sigma^2)=\frac{1}{\sqrt{2\pi\sigma^2}}e^{-\frac{(x-\mu)^2}{2\sigma^2}} \qquad (4)$$

wherein ρ and $\sigma^2$ are the expectation and the variance of the distribution, respectively. All the measurements for the $i^{th}$ fine-tuned speaker at all J measuring points are considered in the $(2i-1)^{th}$ and $2i^{th}$ distributions.

At block 430, for each Gaussian distribution, a k-nearest neighbors algorithm is performed to compute weights for the distributions of the magnitude components and the phase components for each speaker. Then, at block 440, the magnitude components and the phase components for each speaker are weighted and summed to obtain the weighted and summed sound curve (output) for each speaker.

For example, the k-nearest neighbors algorithm (k-NN) for each distribution may be conducted so as to figure out the weight based on the distance to a cluster center. Then, a weighted sum for the k-NN cluster may be performed to generate $M_i^k$ and $\varphi_i^k$ for the in-situ measurement of the $i^{th}$ speaker.

For example, the distance of the $j^{th}$ measurement to the cluster center can be written as, $$d_{M_i}(j)=\frac{1}{N_f}\sum_{f=1}^{N_f}\left|M_i(f,j)-\mu_{M_i}(f,j)\right|, \qquad (5)$$

$$d_{\varphi_i}(j)=\frac{1}{N_f}\sum_{f=1}^{N_f}\left|\varphi_i(f,j)-\mu_{\varphi_i}(f,j)\right|$$

where $d_{Mi}$ and $d\varphi_i$ are the distances to the cluster center of the $M_i$ and $\varphi_i$ distributions, respectively. $N_f$ and f denote the number and index of the frequency bin, respectively. The $\mu_{Mi}$ and $\mu_{\varphi i}$ are the expectations of the $M_i$ and $\varphi_i$ distributions, respectively.

Hence, we will define a function F(•) mapping the distance to a weight that can generate the reasonable $M_i^k$ and $\varphi_i^k$. One example is given as follows, $$F(d_{M_i}(j))=\frac{1/d_{M_i}(j)}{\sum_{j=1}^{J}1/d_{M_i}(j)},\ F(d_{\varphi_i}(j))=\frac{1/d_{\varphi_i}(j)}{\sum_{j=1}^{J}1/d_{\varphi_i}(j)} \qquad (6)$$

-continued $$M_i^k = \sum_{j=1}^{J} M_i(j)F(d_{M_i}(j)),\ \varphi_i^k = \sum_{j=1}^{J} \varphi_i(j)F(d_{\varphi_i}(j)) \quad (7)$$

When the in-situ measurement is performed, the similar procedure from Eq. (1) to Eq. (7) will be performed, but this includes replacing the $\mu_{Mi}$ and $\mu_{\varphi i}$ by the $M_i^k$ and $\varphi_i^k$ in order to obtain the final weighted and summed sound curve, $M_i^a$ and $\varphi_i^a$.

Figure 5:
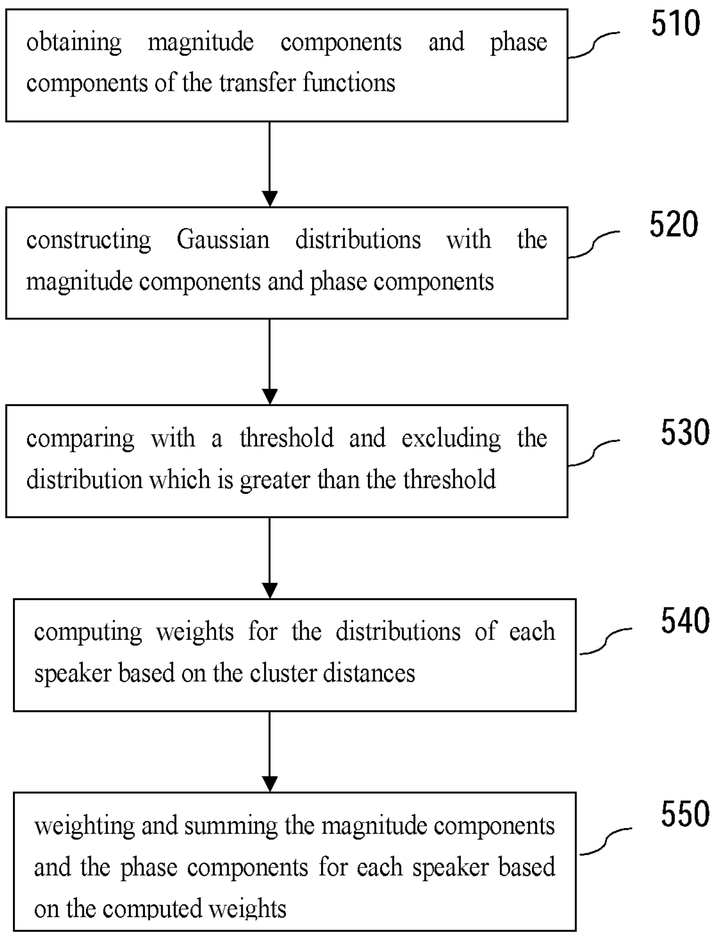
FIG. 5 is a flowchart of the method for room calibration according to another embodiment of the present disclosure.

FIG. 5 shows another aspect of the method. As shown in FIG. 5, at block 510, based on the transfer functions for each speaker, the magnitude components and the phase components may be calculated. Then, at block 520, Gaussian distributions of the magnitude components and the phase components for each speaker may be constructed.

As described above in reference with FIGS. 3-4, with a combination of multiple acoustic measurements in the room using calibrated microphones, a spectral weighting can be performed so as to better refine the room measurement. However, in practice, a measurement in a room includes, but not limited to, room modes, deflections and reflections, which would significantly fluctuate the measurement result. To avoid extreme cases from deviating the measurement results, statistical weighting on the measured frequency responses is used by the room calibration system described herein. Then, as shown in FIG. 5, at block 530, the method compares each distribution of the first magnitude components and the first phase components with a threshold which could be predefined, and excludes the distribution of which the magnitude components and the phase components are greater than the threshold. For example, the threshold of the distributions is set as T, for instance $T=3\sigma^2$. When some measurements of the $M_i$ or $\varphi_i$ are greater than T in the $(2i-1)^{th}$ or $2i^{th}$ distribution, these measurements out of the threshold of distribution are excluded because these abnormal measurements are assumed to be caused by the measurement error or the room modes.

Then, at block 540, for each Gaussian distribution, a k-nearest neighbors algorithm is performed to obtain weights of the magnitude components and the phase components for each speaker based on the cluster distance. At block 550, performing the weighted sum for the magnitude components and the phase components for each speaker to obtain the weighted and summed magnitude components and phase components for each speaker. The processes of blocks 540-550 may refer to the same equalizations described in reference to FIG. 4, thus the details are omitted here.

According to another aspect, the correction curves for each speaker may be obtained by performing a pseudo-inverse on the weighted sound curve of each speaker. Then, the correction curves may be applied to the speakers included in the speaker system. The calibration process generates the correction curves to each speaker of the speaker system, which will playback the input signal with both the magnitude and phase adjustment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for room calibration, comprising:

measuring a plurality of impulse responses at a plurality of measurement points in a room for each speaker of a plurality of speakers, determining a plurality of transfer functions at the plurality of measurement points for each speaker based on the plurality of impulse responses; and weighting and summing the plurality of transfer functions to obtain a weighted and summed sound curve for each speaker, wherein the plurality of impulse responses for each speaker of a plurality of speakers are measured by one or more external microphones.

2. The method of claim 1, wherein the weighting and summing further comprises:

obtaining magnitude components and phase components of the plurality of transfer functions for each speaker;

constructing Gaussian distributions with the magnitude components and the phase components for each speaker;

generating weights for the distributions of the magnitude components and the phase components for each speaker based on a cluster distance; and weighting and summing the magnitude components and the phase components for each speaker based on the weights, to obtain the weighted and summed sound curve for each speaker.

3. The method of claim 2, further comprises:

comparing each distribution of the magnitude components and the phase components with a threshold; and excluding the distribution which is greater than the threshold.

4. The method of claim 2, wherein the method further comprises:

performing a pseudo-inverse operation on the weighted and summed sound curve of each speaker to generate a correction curve for each speaker.

5. The method of claim 4, wherein the method further comprises applying the correction curve to each speaker.

6. The method of claim 2, wherein the weights are obtained by performing a k-nearest neighbors algorithm for each distribution.

7. The method of claim 2, wherein the cluster distance is mapped to a weight with a defined function.

8. The method of claim 1, wherein the measuring a plurality of impulse responses for each speaker comprising:

measuring a plurality of impulse responses for each speaker based on a measurement signal.

9. A system for room calibration, comprising:

a speaker system including a plurality of speakers; and a processor configured to:

measure a plurality of impulse responses at a plurality of measurement points in a room for each speaker of the plurality of speakers, determine a plurality of transfer functions at the plurality of measurement points for each speaker based on the plurality of impulse responses; and weight and sum the plurality of transfer functions to obtain a weighted and summed sound curve for each speaker, wherein the plurality of impulse responses for each speaker of a plurality of speakers are measured by one or more external microphones.

10. The system of claim 9, wherein the processor is further configured to:

obtain magnitude components and phase components of the transfer functions for each speaker;

construct Gaussian distributions with the magnitude components and the phase components for each speaker;

generate weights for the distributions of the magnitude components and the phase components for each speaker based on a cluster distance; and weight and sum the magnitude components and the phase components for each speaker, based on the weights, to obtain the weighted and summed sound curve for each speaker.

11. The system of claim 10, wherein the processor is further configured to:

compare each distribution of the magnitude components and the phase components with a threshold; and exclude the distribution which is greater than the threshold.

12. The system of claim 10, wherein the processor is further configured to:

perform a pseudo-inverse on the weighted and summed sound curve of each speaker to generate a correction curve for each speaker.

13. The system of claim 12, wherein the processor is further configured to apply the correction curve to each speaker.

14. The system of claim 10, wherein the weights are obtained by performing a k-nearest neighbors algorithm for each distribution.

15. The system of claim 10, wherein the cluster distance is mapped to a weight with a defined function.

16. The system of claim 9, wherein the processor is further configured to measure the plurality of impulse responses for each speaker based on a measurement signal.

17. A computer-program product embodied in a non-transitory computer read-able medium that is executable by a processor and is programmed for providing room calibration, the computer-program product comprising instructions for:

measuring a plurality of impulse responses at a plurality of measurement points in a room for each speaker of a plurality of speakers, determining a plurality of transfer functions at the plurality of measurement points for each speaker based on the plurality of impulse responses; and weighting and summing the plurality of transfer functions to obtain a weighted and summed sound curve for each speaker, wherein the weighting and summing further comprises:

obtaining magnitude components and phase components of the plurality of transfer functions for each speaker;

constructing Gaussian distributions with the magnitude components and the phase components for each speaker;

generating weights for the distributions of the magnitude components and the phase components for each speaker based on a cluster distance; and weighting and summing the magnitude components and the phase components for each speaker based on the weights, to obtain the weighted and summed sound curve for each speaker.

* * * * *